US012779982B2

(12) United States Patent
Yoon et al.

(10) Patent No.: US 12,779,982 B2
(45) Date of Patent: Nov. 3, 2026

(54) VARIABLE GRILLE APPARATUS

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Jin Young Yoon, Gimpo-si (KR); Dong Eun Cha, Hwaseong-si (KR); Hong Heui Lee, Suwon-si (KR); Jae Sup Byun, Seongnam-si (KR); Jang Ho Kim, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 504 days.

(21) Appl. No.: 18/372,436

(22) Filed: Sep. 25, 2023

(65) Prior Publication Data

US 2024/0131922 A1 Apr. 25, 2024
US 2024/0227544 A9 Jul. 11, 2024

(30) Foreign Application Priority Data

Oct. 19, 2022 (KR) ........................ 10-2022-0135008

(51) Int. Cl.
*B60K 11/08* (2006.01)

(52) U.S. Cl.
CPC .................................. *B60K 11/085* (2013.01)

(58) Field of Classification Search
CPC ... B60R 2019/525; B60R 19/52; B60R 19/48; B60K 11/08; B60K 11/085; B62D 37/02; F01P 7/10
See application file for complete search history.

(56) References Cited

U.S. PATENT DOCUMENTS

| | | | | |
|---|---|---|---|---|
| 1,570,111 A * | 1/1926 | Wickware | F01P 7/10 | 49/77.1 |
| 6,286,893 B1 * | 9/2001 | Presley | B61H 11/10 | 296/180.5 |
| 6,533,655 B2 * | 3/2003 | Demerath | B60H 1/34 | 454/155 |
| 10,525,919 B2 * | 1/2020 | Frayer | B29C 45/16 | |
| 10,647,194 B1 * | 5/2020 | Burtch | B60K 11/085 | |
| 10,730,384 B1 * | 8/2020 | Klop | B60K 11/00 | |
| 10,889,180 B2 * | 1/2021 | Jeong | B60K 11/08 | |

(Continued)

FOREIGN PATENT DOCUMENTS

| | | | |
|---|---|---|---|
| DE | 102014009385 A1 * | 7/2015 | B60K 11/085 |
| EP | 3724032 B1 | 7/2021 | |

(Continued)

*Primary Examiner* — Carly W. Lynch
(74) *Attorney, Agent, or Firm* — Lempia Summerfield Katz LLC

(57) ABSTRACT

A variable grille apparatus can adjust a flow rate of air flowing through a grille and upgrade an opening/closing operation when adjusting the flow rate of the air, thereby improving merchantability. In addition, by diversifying the opening/closing operation of the grille such as sequentially operating or simultaneously operating the opening/closing operation of the grille, it is possible to upgrade the opening/closing operation of the grille, diversify the exterior design, and secure the flow rate of air through the optimization of the structural arrangement.

16 Claims, 17 Drawing Sheets

(56) References Cited

U.S. PATENT DOCUMENTS

| | | | | |
|---|---|---|---|---|
| 10,948,216 | B2 * | 3/2021 | Roth | F24F 13/15 |
| 2011/0070817 | A1 * | 3/2011 | Walters | B60H 1/34 454/155 |
| 2012/0074729 | A1 * | 3/2012 | Fenchak | B60R 19/52 296/193.1 |
| 2012/0247018 | A1 * | 10/2012 | Stokes | B60K 11/085 49/89.1 |
| 2013/0075172 | A1 * | 3/2013 | Hori | B60K 11/08 180/68.1 |
| 2014/0194052 | A1 * | 7/2014 | Asano | B60K 11/085 454/335 |
| 2019/0023101 | A1 * | 1/2019 | Del Gaizo | F01P 7/10 |
| 2019/0126742 | A1 * | 5/2019 | Kondo | B60K 11/06 |
| 2020/0269679 | A1 * | 8/2020 | Guyon | B60H 1/242 |
| 2020/0307371 | A1 * | 10/2020 | Vacca | B60K 11/08 |
| 2021/0031617 | A1 | 2/2021 | Hayakawa et al. | |
| 2021/0261045 | A1 * | 8/2021 | Cha | B60Q 1/2661 |
| 2022/0410696 | A1 * | 12/2022 | Göbel | B60K 11/08 |
| 2023/0182563 | A1 * | 6/2023 | Jeong | B60K 11/085 180/68.1 |
| 2023/0202289 | A1 * | 6/2023 | Jeong | B60K 11/085 180/68.1 |
| 2025/0269713 | A1 * | 8/2025 | Minero Ramales | B60K 11/08 |

FOREIGN PATENT DOCUMENTS

| | | | | | |
|---|---|---|---|---|---|
| FR | 3159350 | A1 | * | 8/2025 | B60K 11/085 |
| JP | S58139327 | U | * | 9/1983 | B60K 11/085 |
| JP | 2021154799 | A | | 10/2021 | |
| KR | 19990024905 | U | | 7/1999 | |
| KR | 20210060882 | A | * | 5/2021 | B60K 11/06 |
| WO | WO-2022199727 | A1 | * | 9/2022 | G02B 6/00 |

* cited by examiner

VARIABLE GRILLE APPARATUS

CROSS REFERENCE TO RELATED APPLICATION

The present application claims priority to and the benefit of Korean Patent Application No. 10-2022-0135008, filed on Oct. 19, 2022, the entire contents of which are incorporated herein by reference.

FIELD

Background of the Disclosure

The present disclosure relates to a variable type grille device for adjusting a flow rate of air circulating through a grille and improving opening/closing operations of the grill device when the flow rate of air is adjusted.

Description of the Related Art

In general, mobility devices are required to cool their driving system components and cooling system components. Therefore, in order to cool the driving system components and the cooling system components, a grille is formed on a front portion of a mobility device so that air may circulate therethrough.

In other words, when the mobility device (e.g., a vehicle) travels, wind is introduced through the grille, and the wind passes through the driving system components and the cooling system components, such that each component may be cooled through heat exchange with air.

The driving system components and the cooling system components of the mobility device may operate at optimum performance only when they reach a certain temperature range. However, since the grille of the mobility device is formed to be always open, the driving system components and the cooling system components always perform the heat-exchange with the outside air. In other words, under an initial start condition, the introduction of air may have a negative effect on improving aerodynamics and fuel efficiency until the temperature of the driving system component increases to a certain range. In addition, when the mobility travels at a high speed, the flow rate (i.e., speed) of air passing through the grill is excessively increased, which may cause a decrease in fuel efficiency due to an increase in air resistance.

In order to improve this problem, an active air flap is recently provided in the mobility device. The active air flap is installed on the grille and configured to be opened and closed so that the introduction of air is blocked when closed and the air is introduced through the grille when opened.

However, the conventional active air flaps are configured so that a plurality of doors are rotated by a complex link structure. Therefore, the active air flap has a complicated structure, a weight thereof is increased, and a size and capacity of a motor for operating the plurality of doors and a link structure is also increased.

In addition, the conventional active air flaps simply function only to selectively control the flow of air.

The matters explained as the background art are for the purpose of enhancing the understanding of the background of the present disclosure and should not be taken as acknowledging that they correspond to the related art already known to those having ordinary skill in the art.

SUMMARY OF THE DISCLOSURE

The present disclosure provides a variable grille apparatus for adjusting a flow rate of air flowing through a grille and improving merchantability through the advancement of an opening/closing operation when the flow rate of air is adjusted.

In an embodiment of the present disclosure, a variable grille apparatus includes: a housing having a plurality of guide holes forming a moving path formed therein, and at least one flap configured to move in each guide hole and be tilted when moving along the guide holes such that the at least one flap is configured to adjust a degree of opening and closing of a grill of a mobility device according to a tilting position of the at least one flap. The variable grill apparatus further includes: a driving motor installed in the housing and configured to generate rotational power, and at least one rotational plate connected to the driving motor to be rotated. In particular, the at least one rotational plate is formed with a guide unit that extends from an outer side to an inner side in a rotational direction of the rotational plate. The variable grill apparatus further includes at least one connecting link having one end connected to the flap and the other end connected movably along the guide unit of the rotational plate. In one embodiment, when the driving motor rotates the rotational plate, the connecting link performs a linear motion while moved along the guide unit, and the flap connected to the connecting link is tilted while moved along the moving path of the housing.

The flap may be provided on a moving shaft inserted into the guide hole, and the guide hole may be formed on each of an upper end and a lower end of the housing so that both ends of the moving shaft are inserted.

Each of the upper end and the lower end of the housing may be provided with a support unit and a connecting unit disposed to be separated from the support unit to the outside. In one embodiment, the guide hole may include a support hole extending from the support unit in a front-rear direction and a tilting guide hole forming the moving path on the connecting unit.

In another embodiment, a moving unit movably inserted into the support hole and a tilting guide unit bent rearward from the moving unit and movably inserted into the tilting guide hole may be formed on both ends of the moving shaft.

The tilting guide hole may be formed to extend linearly from a front toward a rear and then extend to be curved obliquely.

The tilting guide hole may be formed to extend obliquely from the front toward the rear and then extend linearly.

The tilting guide hole may extend obliquely from the front toward the rear.

The plurality of guide holes may be divided into groups, and the tilting guide hole may be formed differently for each group. In another embodiment, the at least one rotational plate includes a plurality of rotational plates and the at least one flap includes a plurality of flaps, and wherein a number of the plurality of rotational plates is the same as a number of the plurality of flaps.

The plurality of rotational plates may be integrally rotated by a rotational shaft passing therethrough and coupled thereto, and the rotational shaft may be connected to the driving motor and rotated after receiving the rotational power.

The guide unit may be formed as a groove, and a protrusion inserted into the guide unit and moved along the guide unit may be formed on the connecting link.

The guide unit may have a portion that is open to the outside, the portion is positioned on an outermost side of the rotational plate.

The plurality of rotational plates may have the same start and end positions of each guide unit and may be formed in different shapes.

The plurality of rotational plates may have the same start and end positions, and the overall size of the rotational plates may be formed to gradually increase or gradually decrease along an arranged direction.

The flap may be configured so that panel units having a diamond shape are arranged vertically, and the panel units of different flaps may be disposed to partially overlap vertically.

The variable type grille apparatus having the above structure can adjust the flow rate of the air flowing through the grille and improve merchantability through the advancement of the opening/closing operation when the flow rate of the air is adjusted.

In addition, by diversifying the opening/closing operation of the grille such as sequentially operating or simultaneously operating the opening/closing operation of the grille, it is possible to upgrade the opening/closing operation of the grille, diversify the exterior design, and secure the flow rate of the air through the optimization of the structural arrangement.

BRIEF DESCRIPTION OF THE DRAWINGS

The above and other objects, features and other advantages of the present disclosure should be clearly understood from the following detailed description when taken in conjunction with the accompanying drawings, in which.

DETAILED DESCRIPTION OF THE DISCLOSURE

Figure 1:
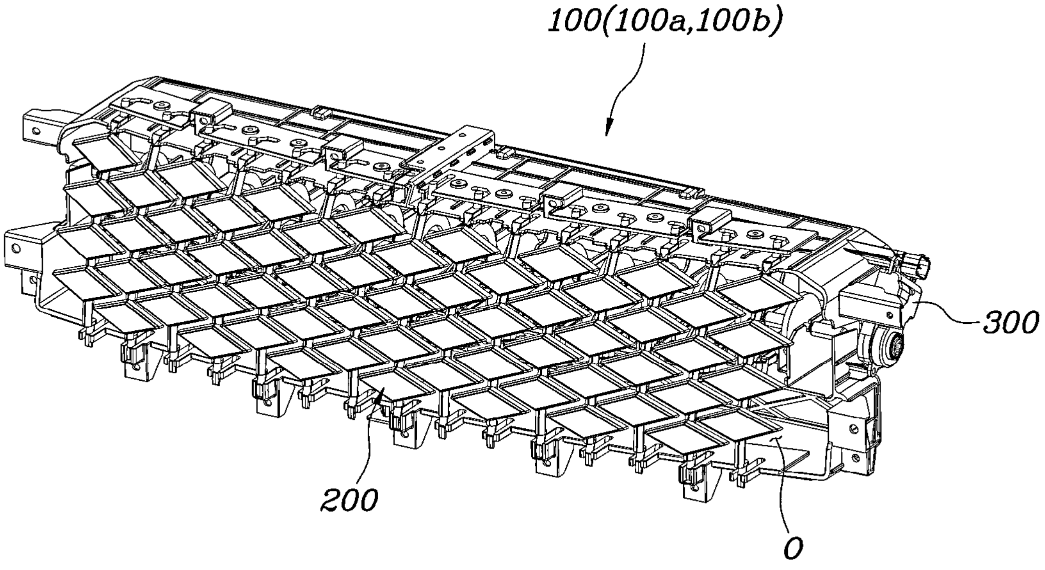
FIG. 1 is a view showing a variable grille apparatus according to an embodiment of the present disclosure.

Hereinafter, embodiments disclosed in the present specification are described in detail with reference to the accompanying drawings, and the same or similar components are given the same reference numerals regardless of reference numerals, and overlapping descriptions thereof have been omitted.

The suffixes "module" and "unit" for components used in the following description are given or used interchangeably in consideration of only the ease of preparing the specification, and do not have distinct meanings or roles by themselves.

In describing the embodiments disclosed in the present specification, when it is determined that detailed descriptions of related known technologies may obscure the gist of the embodiment disclosed in the present specification, detailed descriptions thereof have been omitted. In addition, it should be understood that the accompanying drawings are only for easy understanding of the embodiment disclosed in the present specification, and the technical spirit disclosed herein is not limited by the accompanying drawings, and includes all changes, equivalents, or substitutes included in the spirit and technical scope of the present disclosure.

Terms including ordinal numbers such as first and second may be used to describe various components, but the components are not limited by the terms. The terms are used only for the purpose of distinguishing one component from another.

When a certain component is described as being "connected" or "coupled" to another component, it should be understood that it may also be directly connected or coupled to another component, but other components may be present therebetween. On the other hand, it should be understood that when a certain component is described as being "directly connected" or "directly coupled" to another component, other components are not present therebetween.

The singular expression includes the plural expression unless the context clearly dictates otherwise. When a component, device, element, or the like of the present disclosure is described as having a purpose or performing an operation, function, or the like, the component, device, or element should be considered herein as being "configured to" meet that purpose or to perform that operation or function.

In the present specification, it should be understood that terms such as "comprise" or "have" are intended to specify that the features, numbers, steps, operations, components, parts, or combinations thereof described in the specification are present, but do not preclude the possibility of the presence or addition of one or more other features, numbers, steps, operations, components, parts, or combinations thereof in advance.

A unit or a control unit included in the names of a motor control unit (MCU), a hybrid control unit (HCU), and the like is only the term widely used for naming a controller for controlling a specific function of a vehicle and does not mean a generic function unit.

Hereinafter, a variable grille apparatus according to embodiments of the present disclosure is described with reference to the accompanying drawings.

Figure 2:
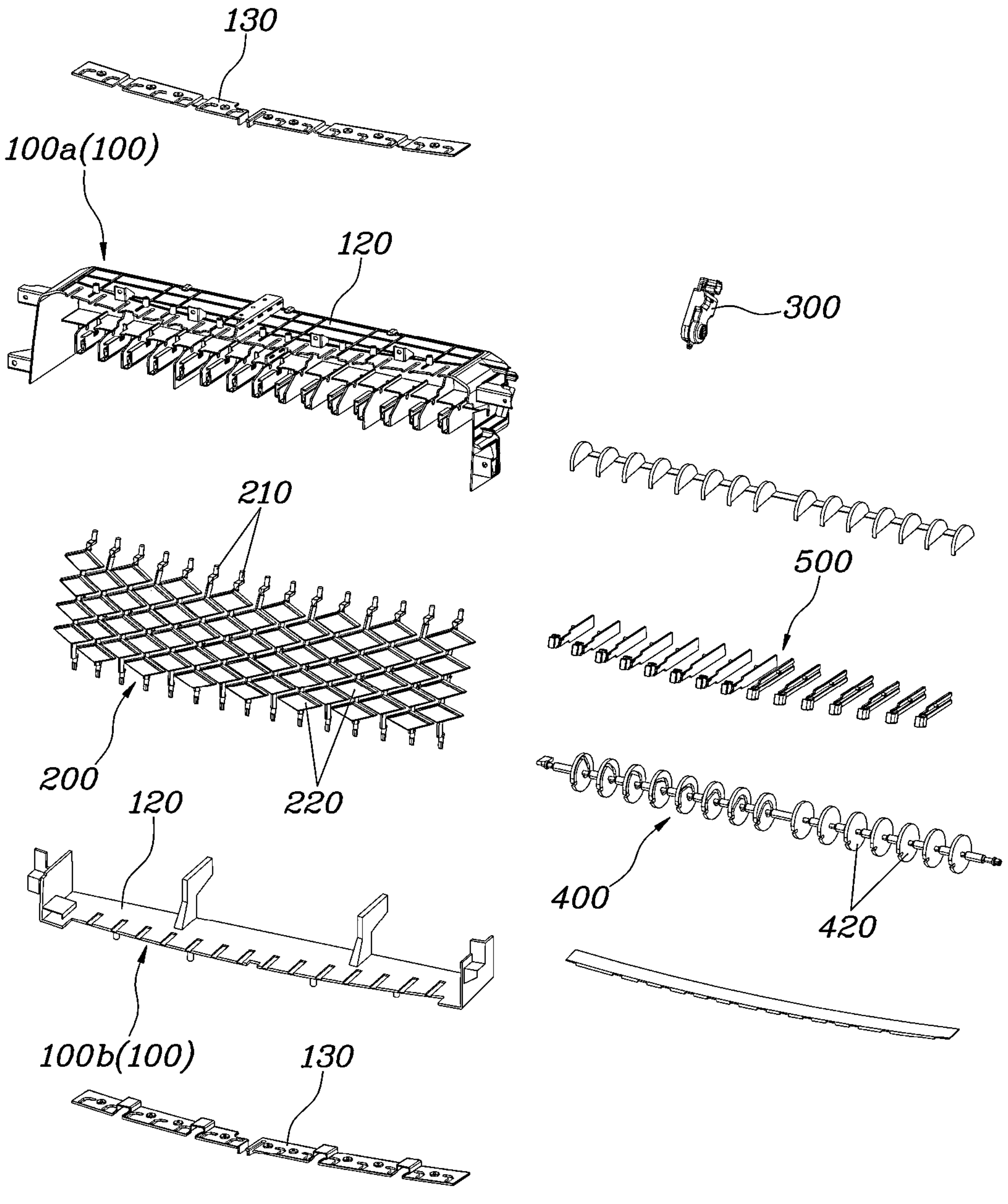
FIG. 2 is an assembly view of the variable grille apparatus shown in FIG. 1.
Figure 3:
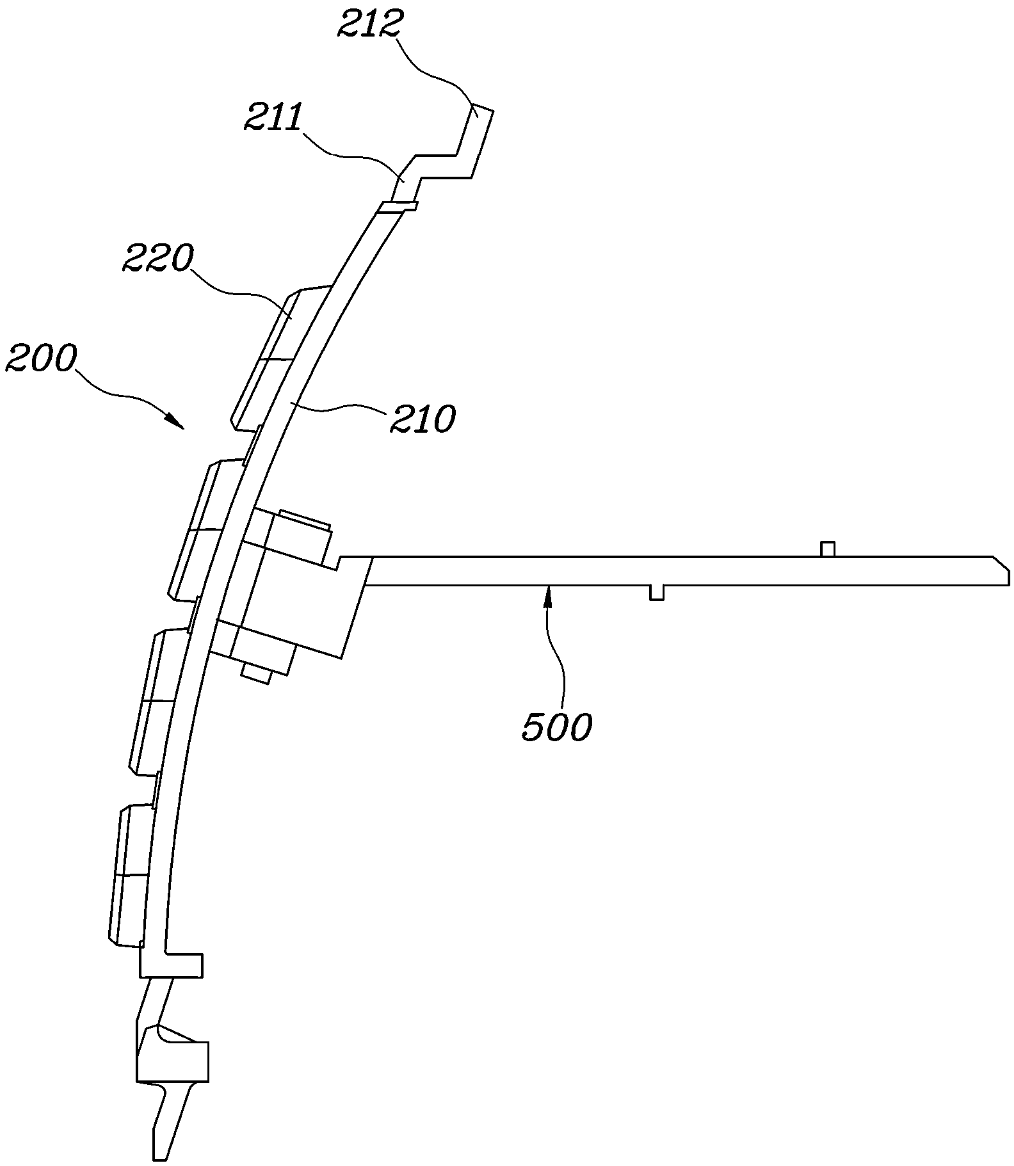
FIG. 3 is a view showing a flap and a connecting link according to an embodiment of the present disclosure.
Figure 4:
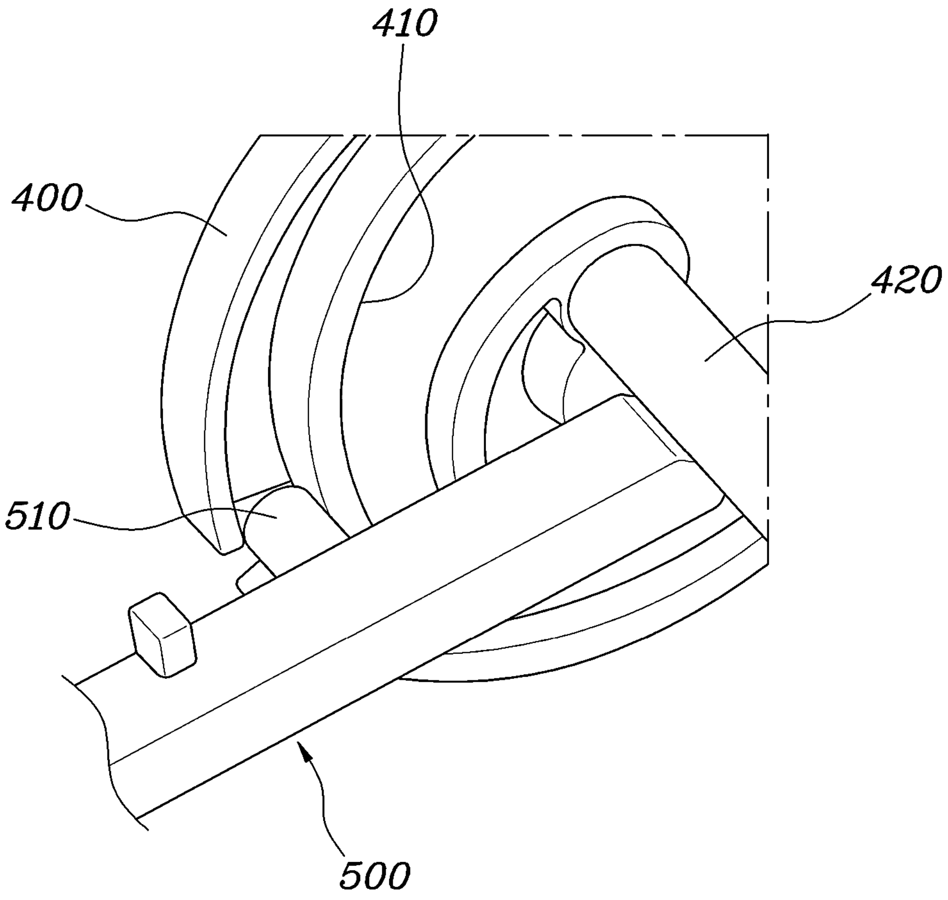
FIG. 4 is a view showing a rotational plate and the connecting link according to an embodiment of the present disclosure.
Figure 5:
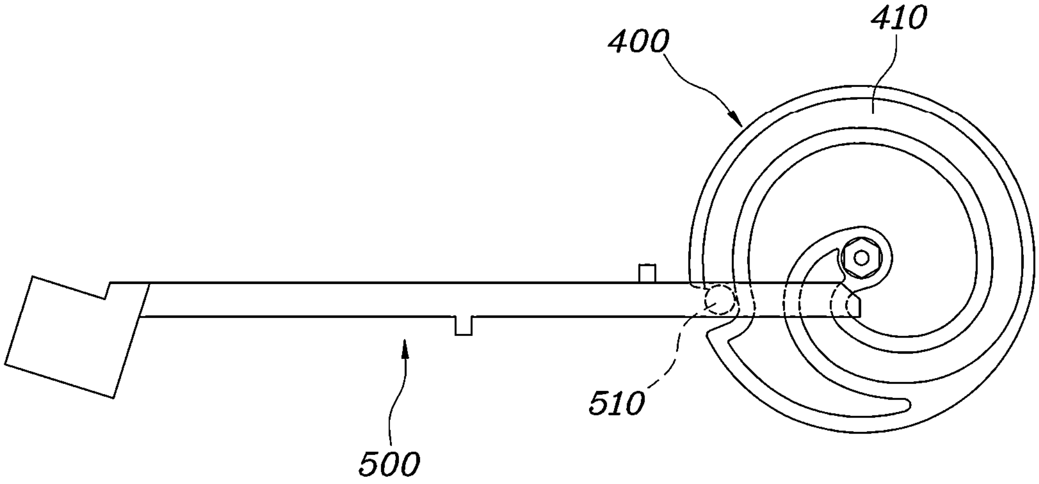
FIG. 5 is a view illustrating a flap closed state of a rotational plate and the connecting link according to an embodiment of the present disclosure.
Figure 6:
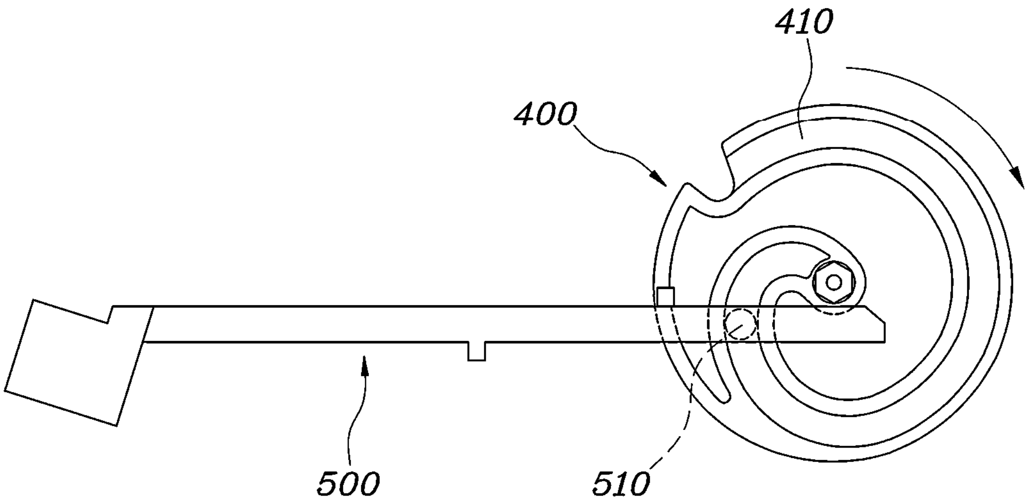
FIG. 6 is a view illustrating a flap opened state of the rotational plate and the connecting link according to an embodiment of the present disclosure.
Figure 7:
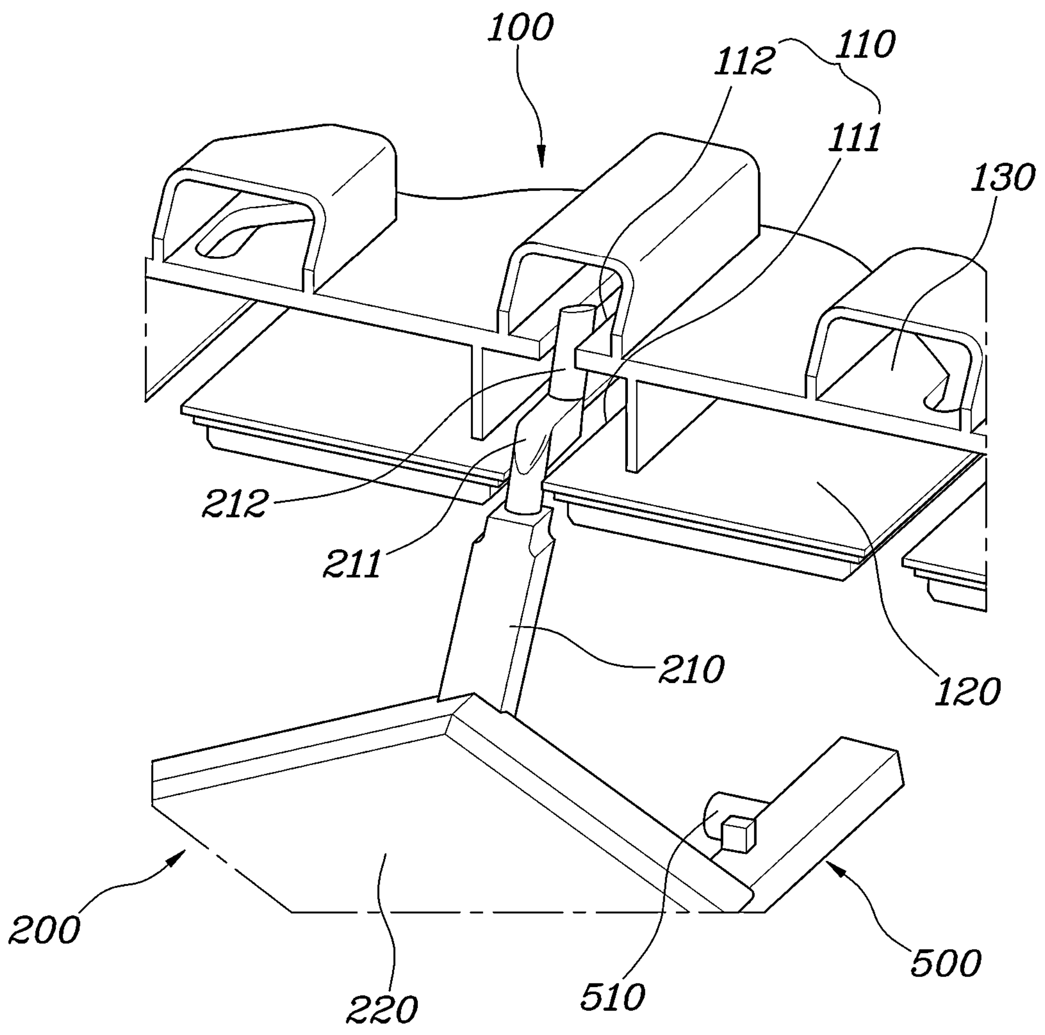
FIG. 7 is a view showing a guide hole of a housing and the flap according to an embodiment of the present disclosure.

FIG. 1 is a view showing a variable type grille apparatus according to an embodiment of the present disclosure, FIG. 2 is an assembly view of the variable type grille apparatus shown in FIG. 1, FIG. 3 is a view showing a flap and a connecting link according to the present disclosure, FIG. 4 is a view showing a rotational plate and the connecting link according to the present disclosure, FIG. 5 is a view for describing a flap closed state of a rotational plate and the connecting link according to the present disclosure, FIG. 6 is a view for describing a flap opened state of the rotational plate and the connecting link according to the present disclosure, and FIG. 7 is a view showing a guide hole of a housing and the flap according to the present disclosure.

Figure 8:
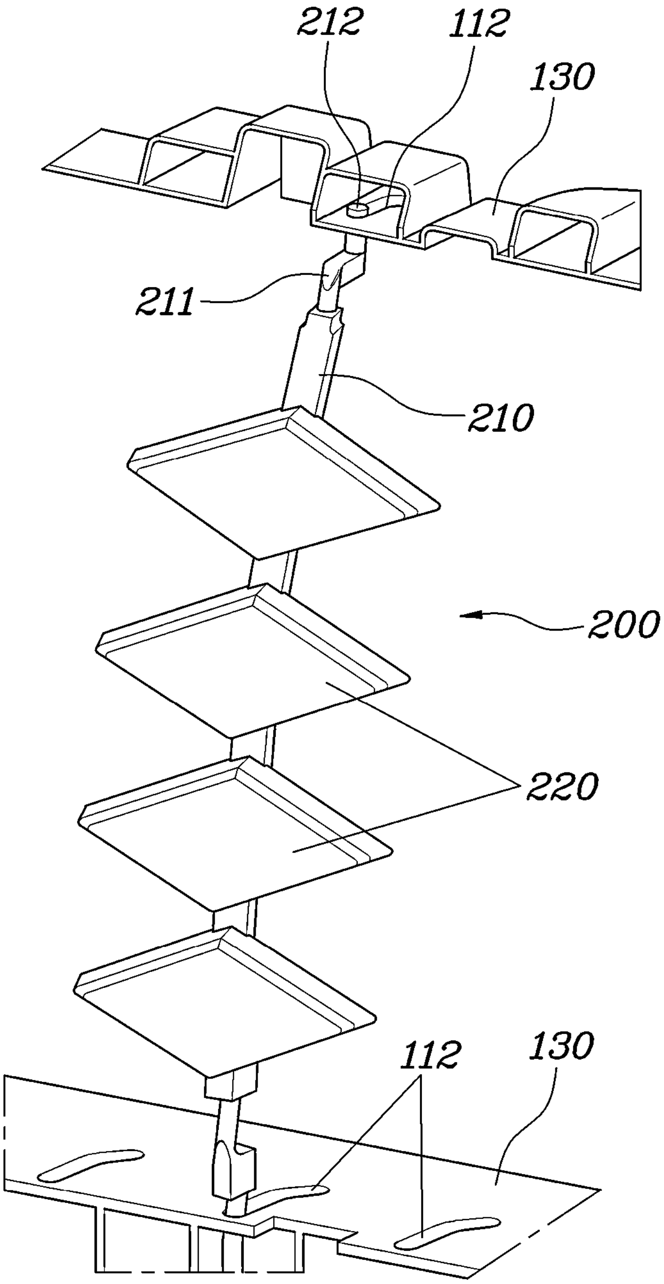
FIG. 8 is a view showing a closed position of the flap according to an embodiment of the present disclosure.
Figure 9:
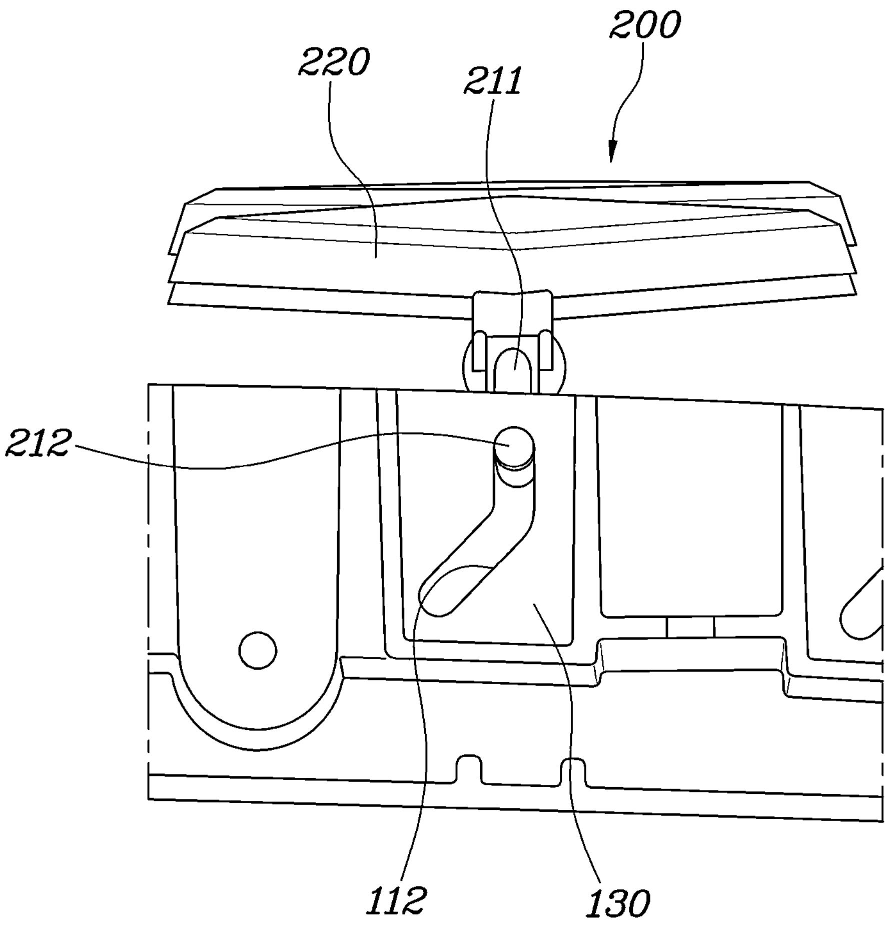
FIG. 9 is a view showing the guide hole at the closed position of the flap shown in FIG. 8.
Figure 10:
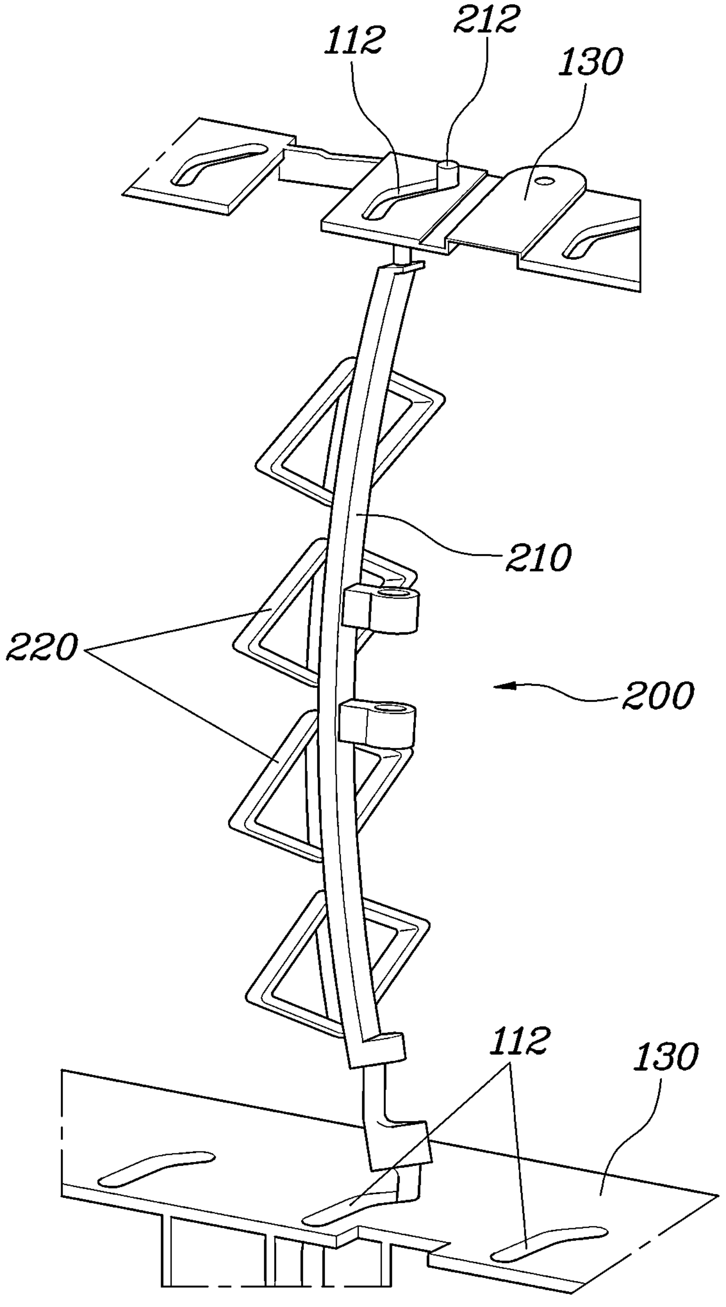
FIG. 10 shows an opened position of the flap according to an embodiment of the present disclosure.
Figure 11:
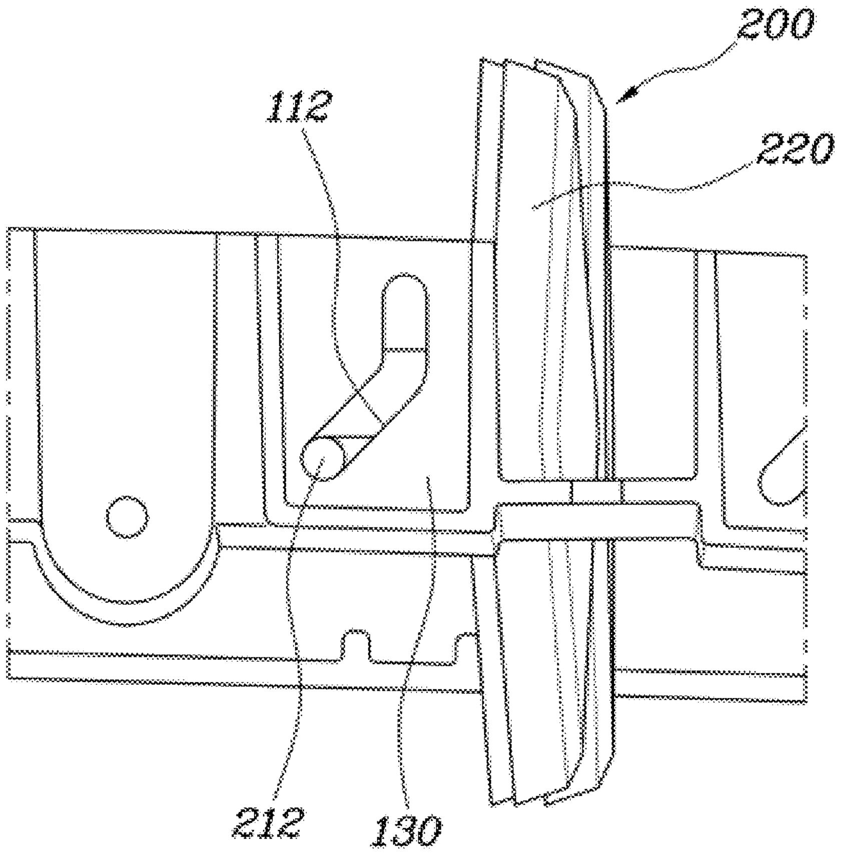
FIG. 11 is a view showing the guide hole at the opened position of the flap shown in FIG. 10.

FIG. 8 is a view showing a closed position of the flap according to the present disclosure, FIG. 9 is a view showing the guide hole at the closed position of the flap shown in FIG. 8, FIG. 10 shows an opened position of the flap according to the present disclosure, and FIG. 11 is a view showing the guide hole at the opened position of the flap shown in FIG. 10.

Figure 12:
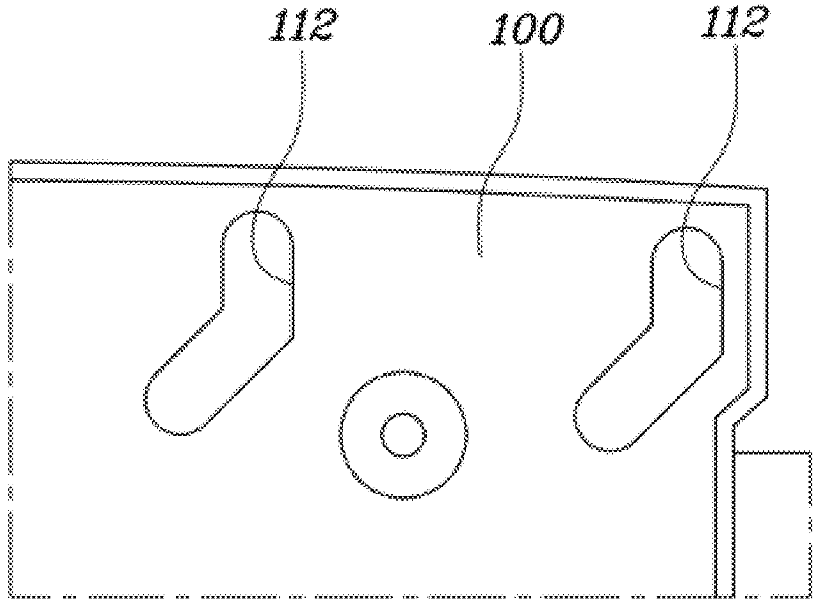
FIG. 12 is a view showing a tilting guide hole of a guide hole according to an embodiment of the present disclosure.
Figure 13:
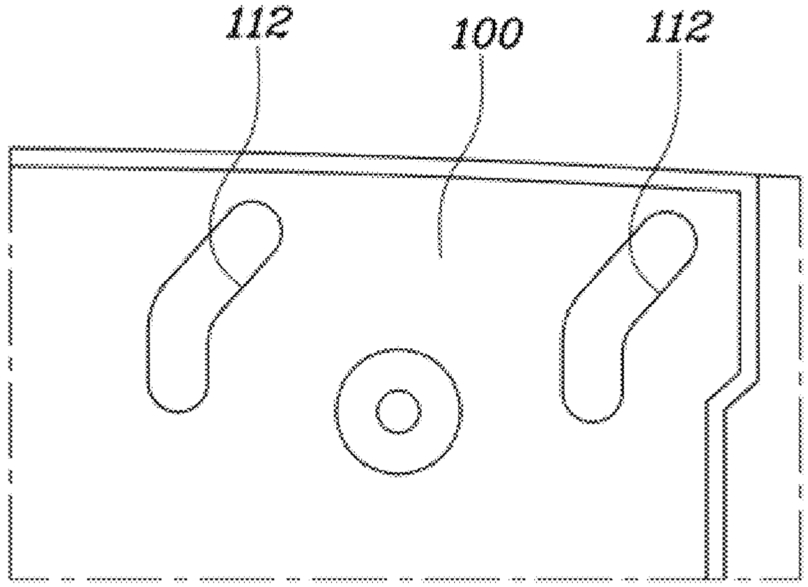
FIG. 13 is a view showing a tilting guide hole of a guide hole according to another embodiment of the present disclosure.
Figure 14:
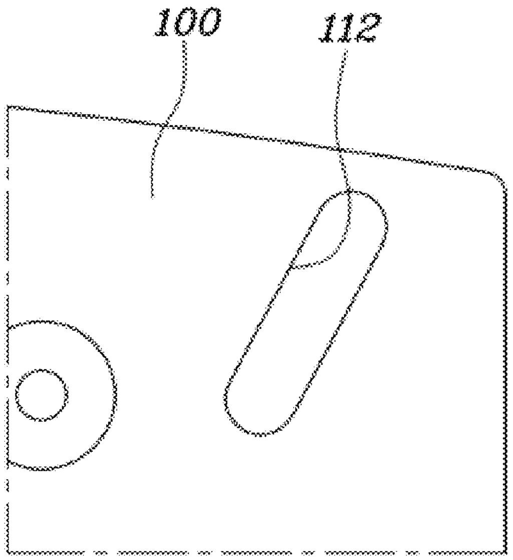
FIG. 14 is a view showing a tilting guide hole of a guide hole according to still another embodiment of the present disclosure.

FIG. 12 is a view showing a tilting guide hole of a guide hole according to an embodiment of the present disclosure, FIG. 13 is a view showing a tilting guide hole of a guide hole according to another embodiment of the present disclosure, and FIG. 14 is a view showing a tilting guide hole of a guide hole according to still another embodiment of the present disclosure.

Figure 15:
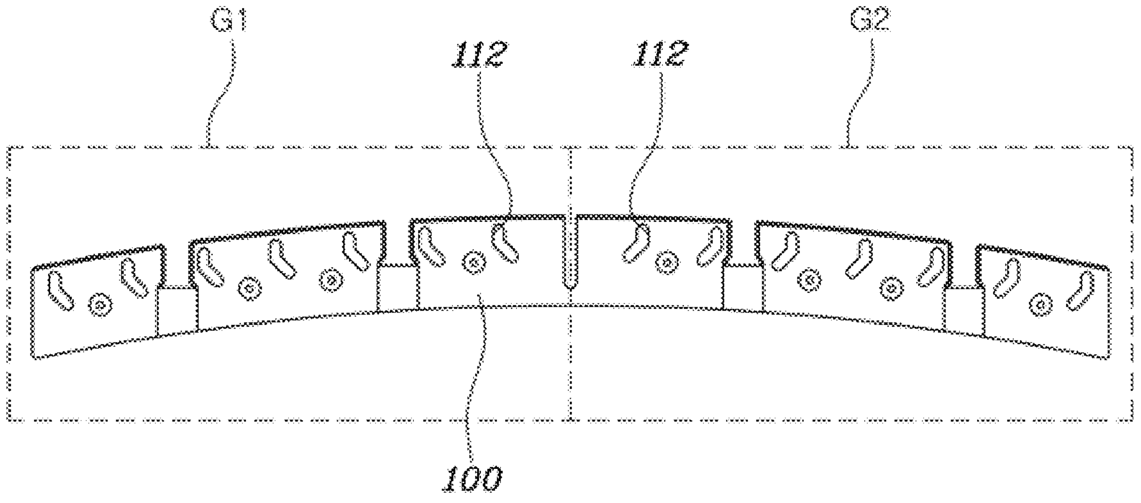
FIG. 15 is a view showing the guide hole of the housing according to an embodiment of the present disclosure.
Figure 16:
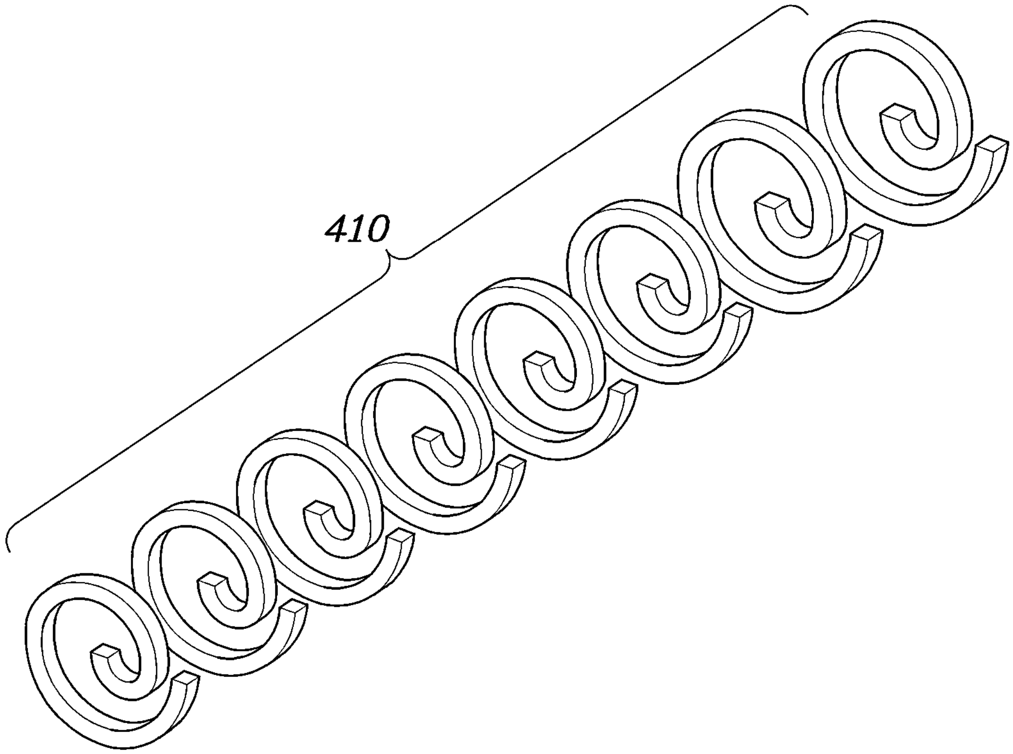
FIG. 16 is a view showing a plurality of rotational plates according to an embodiment of the present disclosure.
Figure 17:
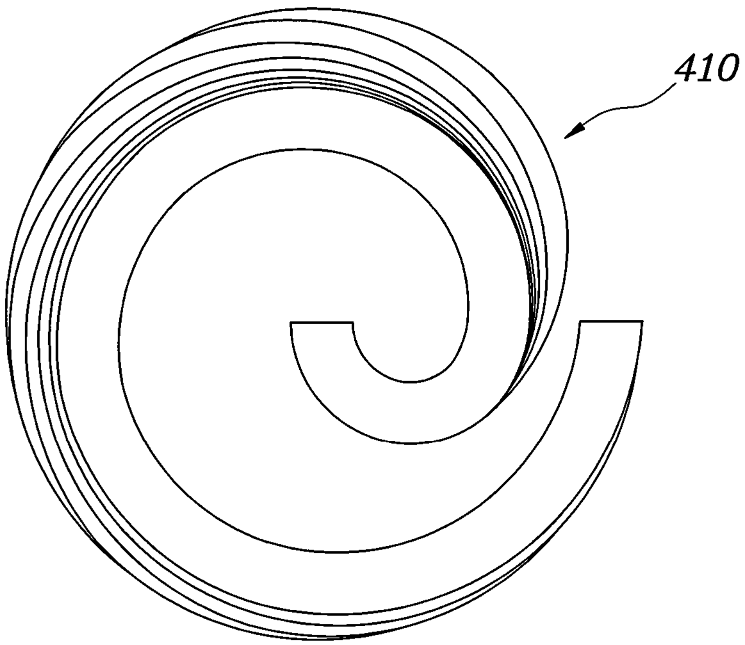
FIG. 17 is a view for describing the plurality of rotational plates according to the embodiment shown in FIG. 16.

FIG. 15 is a view showing the guide hole of the housing according to the embodiment of the present disclosure, FIG. 16 is a view showing a plurality of rotational plates according to the embodiment of the present disclosure, and FIG. 17 is a view for describing the plurality of rotational plates according to the embodiment shown in FIG. 16.

According to one embodiment of the present disclosure, a variable grille apparatus includes a housing 100 having a plurality of guide holes 110 forming a moving path formed therein, and a flap 200 movably provided in each guide hole 110 of the housing 100. The flap 200 is tilted when moving along the guide hole 110 and a degree of opening and closing of the flap 200 is adjustable according to a tilting position of the flap 200. The variable grill apparatus further includes: a driving motor 300 installed in the housing 100 and configured to generate rotational power, and a plurality of rotational plates 400 connected to the driving motor 300 and configured to be rotated by the driving motor 300. In one embodiment, the variable grill apparatus includes a plurality of flaps 200, and the number of the rotational plates 400 may set to match the number of the flaps 200. In another embodiment, each rotational plates 400 is formed with a guide unit 410 extending from an outer side to an inner side along a rotational direction of the rotational plate 400. The variable grille apparatus includes a plurality of connecting links 500 each having one end connected to the flap 200 and the other end connected movably along the guide unit 410 of the rotational plate 400.

The housing 100 is installed on a front portion of the mobility device and may be installed on the grille. An open space through which air flows is formed in the housing 100, and the air flows through the open space so that driving system components or electric system components may be cooled. In addition, the housing 100 can be separated vertically and assembled for convenience.

The flap 200 is movably and rotatably installed in the housing 100, and the open space O is selectively opened or closed according to the moving and rotating positions of the flap 200.

When the driving motor 300 operates, the flap 200 is opened and closed by a connection operation between the rotational plate 400 and the connecting link 500. In other words, when the driving motor 300 is operated, as the rotational plate 400 is rotated and the flap 200 connected to the rotational plate 400 via the connecting link 500 moves linearly in conjunction with a rotational motion of the rotational plate 400, the flap 200 is moved in a front-rear direction. At this time, the flap 200 is rotated while moving along the moving path according to a shape of the guide hole 110 of the housing 100 and has an adjusted opening/closing position. The driving motor 300 may be operated after receiving a control command through a motor controller.

In other words, the flap 200 and the rotational plate 400 are connected via the connecting link 500, and the guide unit 410 for guide the movement of the connecting link 500 is formed on the rotational plate 400, and thus when the rotational plate 400 rotates, the connecting link 500 performs a linear motion by being moved along a shape of the guide unit 410.

As shown in FIG. 4, the guide unit 410 of the rotational plate 400 may be formed as a groove extending from an outer side to an inner side in the rotational direction of the rotational plate 400, and a protrusion 510 inserted into the connecting link 500 and moved along the guide unit 410 may be formed on the connecting link 500.

As described above, the guide unit 410 of the rotational plate 400 may be formed in a groove shape, and the protrusion 510 inserted into the guide unit 410 may be formed on the connecting link 500, and thus the connecting link 500 may be connected to the rotational plate 400 and moved along the shape of the guide unit 410.

Therefore, as shown in FIGS. 5 and 6, the guide unit 410 is formed in a curved shape toward the center from an outer side to an inner side of the rotational plate 400. For example, the guide unit 410 continuously extends from the outer side to the inner side in the rotational direction, forming a spiral shape (e.g., a continuous curve that gradually moves away from or towards the center). Therefore, when the rotational plate 400 is rotated, there occurs a behavior of the connecting link 500 moving from the outer side to the inner side of the rotational plate 400 along the extended shape of the guide unit 410. In other words, since the connecting link 500 performs the linear motion by the rotational motion of the rotational plate 400, an operation in which the flap 200 connected to the connecting link 500 is pulled rearward or pushed forward is performed. Therefore, as the flap 200 moves in the front-rear direction according to the rotational position of the rotational plate 400 and at the same time, is rotated along the moving path according to the guide hole 110 of the housing 100, the flap 200 may be operated to open or close the open space of the housing 100.

In addition, the guide unit 410 may have a portion that is open to the outside. The portion is positioned on an outermost side of the rotational plate 400. Therefore, when the connecting link 500 is connected to the rotational plate 400, the protrusion 510 may enter the guide unit 410 through the open portion of the rotational plate 400, and when the rotational plate 400 rotates, the protrusion 510 is positioned to be surrounded around the guide unit 410. Therefore, the connecting link 500 may be easily connected to the rotational plate 400, and the linear motion of the connecting link 500 according to the rotational motion of the rotational plate 400 may be performed in the state in which the protrusion 510 is connected to the guide unit 410 of the rotational plate 400.

As described above, according to the present disclosure, when the driving motor 300 operates, the rotational plate 400 is rotated after receiving rotational power, and the connecting link 500 connected to the rotational plate 400 is moved along the guide unit 410, and thus the connecting link 500 performs the linear motion by the rotational motion of the rotational plate 400. As described above, when the connecting link 500 is moved in the front-rear direction, as the flap 200 connected to the connecting link 500 is rotated while moving along the moving path according to the shape of the guide hole 110 of the housing 100, the flap 200 may open or close the open space of the housing 100.

Specifically describing the present disclosure described above, as shown in FIGS. 7 and 8, the flap 200 is provided on a moving shaft 210 inserted into the guide hole 110, and the guide hole 110 is formed in each of an upper end 100*a* and a lower end 100*b* of the housing 100 so that both ends of the moving shaft 210 may be inserted.

In other words, the flap 200 is provided on the moving shaft 210, and the moving shaft 210 is inserted movably along the guide holes 110 formed in the upper end 100*a* and the lower end 100*b* of the housing 100. Here, the guide hole 110 forms a moving path of the moving shaft 210, and thus the moving shaft 210 is moved or tilted along the guide hole 110 so that the flap 200 is opened or closed.

As described above, the flap 200 is mounted on the moving shaft 210, and the moving shaft 210 is rotatably connected to the connecting link 500 in a hinge structure, and thus moved in the front-rear direction together with the connecting link 500 and tilted along the moving path of the guide hole 110.

Specifically, as shown in FIGS. 8 to 11, each of the upper end 100*a* and the lower end 100*b* of the housing 100 may be provided with a support unit 120 and a connecting unit 130 disposed to be separated outward from the support unit 120. The guide hole 110 may include a support hole 111 extending from the support unit 120 in the front-rear direction and a tilting guide hole 112 forming the moving path on the connecting unit 130.

In addition, a moving unit 211 movably inserted into the support hole 111 and a tilting guide unit 212 bent rearward from the moving unit 211 and movably inserted into the tilting guide hole 112 may be formed on both ends of the moving shaft 210.

In other words, as the upper end 100*a* and the lower end 100*b* of the housing 100 are formed on the moving unit 211 and the tilting guide unit 212, the upper end 100*a* and the lower end 100*b* of the housing 100 may be formed in a multi-layered structure. Here, the support hole 111 extending in the front-rear direction and for guiding the linear motion of the moving shaft 210 is formed in the support unit 120, and the tilting guide hole 112 extending to form the moving path and for guide the tilting operation of the moving shaft 210 may be formed on the connecting unit 130.

Therefore, the moving unit 211 of the moving shaft 210 is movably inserted into the support hole 111, thereby preventing the shaft of the moving shaft 210 from being twisted and also stabilizing the linear behavior. In particular, the tilting guide unit 212 of the moving shaft 210 is bent rearward from the moving unit 211 and movably inserted into the tilting guide hole 112, and thus is moved along the moving path formed by the tilting guide hole 112. In other words, as the tilting guide unit 212 of the moving shaft 210 has a shape bent rearward from the moving unit 211, the axis of the moving unit 211 and the axis of the tilting guide unit 212 are disposed to be spaced apart from each other, and the tilting guide unit 212 may be rotated about the axis of the moving unit 211.

Therefore, the moving unit 211 moves only in a linear direction in the support hole 111 and the flap 200 moves with the moving shaft 210, and as the tilting guide unit 212 is tilted while moving along the tilting guide hole 112, the flap 200 may be tilted by the rotation of the moving shaft 210.

The tilting guide hole 112 may variously implement the tilting operation of the flap 200 according to the shape of the moving path.

As one embodiment, as shown in FIG. 12, the tilting guide hole 112 may be formed to extend linearly from a front toward a rear and then extend to be curved obliquely.

Therefore, as the rotational plate 400 is rotated by the operation of the driving motor 300 and the connecting link 500 performs the linear motion by the rotation of the rotational plate 400, when the flap 200 moves rearward, the tilting guide unit 212 of the moving shaft 210 is moved rearward from the tilting guide hole 112 and then rotated along the obliquely curved shape. Therefore, the flap 200 may perform an operation of opening the open space of the housing 100 while rotated after retreating rearward. When the flap 200 closes the open space of the housing 100, this may be the reverse of the operation of opening the open space.

As another embodiment, as shown in FIG. 13, the tilting guide hole 112 may be formed to extend obliquely from the front toward the rear and then extend linearly.

Therefore, as the rotational plate 400 is rotated by the operation of the driving motor 300 and the connecting link 500 is linearly moved by the rotation of the rotational plate 400, when the flap 200 moves rearward, the operation of opening the open space of the housing 100 may be performed while the tilting guide unit 212 of the moving shaft 210 is rotated in the tilting guide hole 112 and then retreats rearward. When the flap 200 closes the open space of the housing 100, this may be the reverse of the operation of opening the open space.

As still another embodiment, as shown in FIG. 14, the tilting guide hole 112 may extend obliquely from the front to the rear.

Therefore, as the rotational plate 400 is rotated by the operation of the driving motor 300 and the connecting link 500 is linearly moved by the rotation of the rotational plate 400, when the flap 200 moves rearward, the tilting guide unit 212 of the moving shaft 210 is rotated at the same time as moved rearward along the tilting guide hole 112, and the operation of opening the open space of the housing 100 may be performed. In addition, as the tilting guide hole 112 has an obliquely lengthily extended shape, since an obliquely extended angle is smooth, the rotational operation of the flap 200 may be performed slowly compared to other embodiments described above.

As described above, the tilting operation and speed of the flap 200 may be diversified according to the shape of the tilting guide hole 112, and various embodiments as well as the above-described embodiments may be applied. However, since the flap 200 needs to be rotated 90 degrees in order to be switched to the opened or closed state, the shape of the tilting guide hole 112 may be diversified within a condition that an initial position and a final position of the tilting guide unit 212 are the same.

Meanwhile, the plurality of guide holes 110 may be divided into groups, and the tilting guide hole 112 may be formed differently for each group.

As described above, all of the plurality of guide holes 110 are formed in the same shape to unify the tilting operation of the flap 200, or the plurality of guide holes 110 are divided into groups, and each tilting guide hole 112 forming each guide hole 110 may be formed differently.

For example, as shown in FIG. 15, the plurality of guide holes 110 are divided into a left group G1 and a right group G2 at the center of the housing 100, the tilting guide hole 112 forming the guide hole 110 of the left group G1 may be formed in a shape bent rightward in the drawing, and the tilting guide hole 112 forming the guide hole 110 of the right group G2 may be formed in a shape bent leftward in the drawing. Therefore, the plurality of flaps 200 can perform opening/closing operations in different directions for each group, thereby upgrading the opening/closing operation of the flap 200 and improving merchantability.

Meanwhile, the plurality of rotational plates 400 may be integrally rotated by a rotational shaft 420 passing therethrough and coupled thereto, and the rotational shaft 420 may be connected to the driving motor 300 and rotated after receiving rotational power.

In one embodiment according to the present disclosure, as a plurality of flaps 200 are formed, a plurality of rotational plates 400 and connecting links 500 are formed. Therefore, the rotational plates 400 are arranged in the housing 100, and one rotational shaft 420 passes through and is coupled to the plurality of rotational plates 400 so that the plurality of rotational plates 400 may be rotated through the rotation of the rotational shaft 420. The rotational shaft 420 may be supported through a separate rib structure provided in the housing 100, thereby preventing sagging.

Meanwhile, the plurality of rotational plates 400 according to one embodiment of the present disclosure may have the same start and end positions of each guide unit 410 but may be formed in different shapes.

In the present disclosure, the guide unit 410 of the rotational plate 400 is to guide the movement of the connecting link 500, and a moving distance and a moving speed of the connecting link 500 are determined according to the shape of the guide unit 410.

Therefore, the plurality of rotational plates 400 may form the shape of each guide unit 410 differently to diversify the linear movement operation of the connecting link 500, thereby differently adjusting an opening/closing speed of each flap 200.

However, the plurality of rotational plates 400 are formed to have the same start and end positions of each guide unit 410 so that the initial position and the last position of the connecting link 500 connected to each rotational plate 400 are matched, and thus opened or closed positions of the flaps 200 are matched. In other words, when the opened or closed positions of the flaps 200 are different, assembly defects and aesthetic degradation may occur when the flaps 200 are viewed from the outside. Therefore, the plurality of rotational plates 400 have different shapes of each guide units 410 so that the opening/closing speeds of the flaps 200 are diversified, and the opened or closed positions of the flaps 200 are matched, thereby preventing the degradation of merchantability.

Therefore, as one embodiment, the plurality of rotational plates 400 have the same start and end positions of each guide unit 410 in the arranged direction, and the overall size of the rotational plates 400 may be formed to gradually decrease or gradually increase.

As shown in FIGS. 16 and 17, when the guide unit 410 of each rotational plate 400 is formed to have a gradually increased size in a direction in which the plurality of rotational plates 400 are arranged, the connecting link 500 linearly moved when each rotational plate 400 rotates has a slower speed moving in the direction in which the rotational plates 400 are arranged. Therefore, the plurality of flaps 200 perform the sequential opening/closing operation as each connecting link 500 is sequentially moved linearly by the shape of the guide unit 410 of each rotational plate 400.

In addition, the plurality of rotational plates 400 may be divided into groups and formed to have different shapes of each guide unit 410, and thus the plurality of flaps 200 may also be configured so that the opening/closing speeds of the plurality of flaps 200 are adjusted for each group.

Therefore, the opening/closing speeds of the plurality of flaps 200 are divided for each group, and thus the opening/closing speeds of the plurality of flaps 200 may be different for each section in the grille, thereby upgrading the opening/closing operation of the flap 200 and variously providing the sense of operation.

As described above, according to the present disclosure, the flap 200 may be provided in the open space of the housing 100 to open or close the open space, the tilted direction and speed of each flap 200 may be adjusted according to the shape of the guide hole 110 of the housing 100, and the opening/closing speed of the flap 200 may be adjusted according to the shape of the guide unit 410 of the rotational plate 400, thereby diversifying the opened or closed operations of the plurality of flaps 200 to improve the exterior design and upgrading the opening/closing operation of the flap 200 to improve merchantability.

In one embodiment of the present disclosure, the plurality of flaps 200, connecting links 500, and rotational plates 400 may be configured and arranged laterally in the open space of the housing 100. Each flap 200 may include panel units 220 that have a diamond shape and are arranged vertically, and the panel units 220 of adjacent flaps, among the plurality of flaps 200, may be disposed to partially overlap vertically.

If multiple flaps 200 are used, then multiple connecting links 500 and rotational plates 400 that are connected to the flaps 200 may also be used.

In one embodiment, the flap 200 may include the diamond-shaped panel units 220, and the panel units 220 are configured to be arranged in a longitudinal direction of the moving shaft 210. When the flaps 200 are arranged laterally in the open space of the housing 100, and the panel units 220 of each flap 200 may be disposed to partially overlap. Therefore, when the flap 200 is disposed to close the open space, the panel unit 220 of each flap 200 may close the open space of the housing 100, and when the flap 200 is disposed to open the open space of the housing 100, each panel unit may be configured to open the open space while rotating about 90 degrees. The plurality of flaps 200 may be implemented to simultaneously perform the opening/closing operation or sequentially perform the opening/closing operation, and the shape of the flap 200 and the number of flaps 200 may be changed variously depending on the design of the grille.

As described above, the variable type grille apparatus according to the present disclosure can adjust the flow rate of the air flowing through the grille and upgrade the opening/closing operation when adjusting the flow rate of the air, thereby improving merchantability.

In addition, by diversifying the opening/closing operation of the grille such as sequentially operating or simultaneously operating the opening/closing operation of the grille, it is possible to upgrade the opening/closing operation of the grille, diversify the exterior design, and secure the flow rate of the air through the optimization of the structural arrangement.

Although the present disclosure has been shown and described with respect to specific embodiments, it should be apparent to those having ordinary skill in the art that the present disclosure may be variously improved and changed without departing from the technical spirit of the present disclosure.

What is claimed is:

1. A variable grille apparatus comprising:
- a housing having a plurality of guide holes forming a moving path formed therein;
- at least one flap configured to:
  - move in each guide hole and configured to be tilted,
  - when the at least one flap moves along the guide hole,
    - a degree of opening and closing of the at least one flap is adjusted according to a tilting position of the at least one flap;
- a driving motor installed in the housing and configured to generate rotational power;
- at least one rotational plate connected to the driving motor and configured to be rotated,
- wherein the at least one rotational plate is formed with a guide unit that extends from an outer side to an inner side along a rotational direction of the at least one rotational plate; and
- at least one connecting link including a first end connected to the at least one flap and a second end movably connected along the guide unit,
- wherein when the driving motor rotates the at least one rotational plate, the at least one connecting link is configured to perform a linear motion while moving along the guide unit, and the at least one flap connected to the at least one connecting link is tilted while moving along the moving path of the housing, and
- wherein the guide unit has a portion that is open to an outside on an outermost side of the at least one rotational plate.

2. The variable grille apparatus of claim 1, wherein the at least one flap is provided on a moving shaft, and
- the plurality of guide holes includes a first guide hole formed on an upper end of the housing and a second guide hole formed on a lower end of the housing so that ends of the moving shaft are inserted into the first and second guide holes, respectively.

3. The variable grille apparatus of claim 2, wherein each of the upper end and the lower end of the housing are provided with a support unit and a connecting unit disposed to be separated from the support unit to an outside, and
- each guide hole of the plurality of guide holes includes a support hole extending from the support unit in a front-rear direction and a tilting guide hole forming the moving path on the connecting unit.

4. The variable grille apparatus of claim 3, wherein a moving unit movably inserted into the support hole and a tilting guide unit bent rearward from the moving unit and movably inserted into the tilting guide hole are formed on both ends of the moving shaft.

5. The variable grille apparatus of claim 3, wherein the tilting guide hole is formed to extend linearly from a front toward a rear and then extend to be curved obliquely.

6. The variable grille apparatus of claim 3, wherein the tilting guide hole is formed to extend obliquely from a front toward a rear and then extend linearly.

7. The variable grille apparatus of claim 3, wherein the tilting guide hole extends obliquely from a front toward a rear.

8. The variable grille apparatus of claim 3, wherein the plurality of guide holes are divided into groups, and tilting guide holes of the plurality of guide holes are formed differently for each group.

9. The variable grille apparatus of claim 1, wherein the at least one rotational plate is rotated by a rotational shaft passing therethrough and coupled thereto, and the rotational shaft is connected to the driving motor and rotated upon receiving the rotational power.

10. The variable grille apparatus of claim 1, wherein the guide unit is formed as a groove, and the at least one connecting link includes a protrusion configured to insert into the guide unit and move along the guide unit.

11. The variable grille apparatus of claim 1, wherein the at least one rotational plate includes a plurality of rotational plates and the at least one flap includes a plurality of flaps, and wherein a number of the plurality of rotational plates is the same as a number of the plurality of flaps.

12. The variable grille apparatus of claim 11, wherein the plurality of rotational plates each have the guide unit, and each guide unit has a same start and end position and are formed in different shapes.

13. The variable grille apparatus of claim 12, wherein the plurality of rotational plates have different sizes and are arranged according to the sizes thereof such that an overall size of the plurality of rotational plates is arranged to gradually increase or gradually decrease along an arranged direction.

14. The variable grille apparatus of claim 11, wherein each of the plurality of flaps includes panel units vertically arranged, and the panel units of different flaps among the plurality of flaps are disposed to partially overlap vertically.

15. The variable grille apparatus of claim 1, wherein the at least one flap includes panel units having a diamond shape and the panel units are arranged vertically.

16. A variable grille apparatus comprising:
- a housing having a plurality of guide holes forming a moving path formed therein;
- at least one flap configured to:
  - move in each guide hole and configured to be tilted,
  - when the at least one flap moves along the guide hole,
    - a degree of opening and closing of the at least one flap is adjusted according to a tilting position of the at least one flap;
- a driving motor installed in the housing and configured to generate rotational power;
- at least one rotational plate connected to the driving motor and configured to be rotated,
- wherein the at least one rotational plate is formed with a guide unit that extends from an outer side to an inner side along a rotational direction of the at least one rotational plate; and
- at least one connecting link including a first end connected to the at least one flap and a second end movably connected along the guide unit,
- wherein when the driving motor rotates the at least one rotational plate, the at least one connecting link is configured to perform a linear motion while moving along the guide unit, and the at least one flap connected to the at least one connecting link is tilted while moving along the moving path of the housing,
- wherein the at least one rotational plate includes a plurality of rotational plates and the at least one flap includes a plurality of flaps, and wherein a number of the plurality of rotational plates is the same as a number of the plurality of flaps, and wherein the plurality of rotational plates each have the guide unit, and each guide unit has a same start and end position and are formed in different shapes.

* * * * *